(12) United States Patent
Gallager

(10) Patent No.: US 10,222,688 B2
(45) Date of Patent: Mar. 5, 2019

(54) CONTINUOUS PARTICLE IMAGING AND CLASSIFICATION SYSTEM

(71) Applicant: Woods Hole Oceanographic Institution, Woods Hole, MA (US)

(72) Inventor: Scott M. Gallager, North Falmouth, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 0 days.

(21) Appl. No.: 15/512,893

(22) PCT Filed: Sep. 21, 2015

(86) PCT No.: PCT/US2015/051121
§ 371 (c)(1),
(2) Date: Mar. 21, 2017

(87) PCT Pub. No.: WO2016/048851
PCT Pub. Date: Mar. 31, 2016

(65) Prior Publication Data
US 2017/0293217 A1  Oct. 12, 2017

Related U.S. Application Data

(60) Provisional application No. 62/053,484, filed on Sep. 22, 2014.

(51) Int. Cl.
*G06K 9/00* (2006.01)
*G03B 41/00* (2006.01)
(Continued)

(52) U.S. Cl.
CPC ............. *G03B 41/00* (2013.01); *A01K 61/90* (2017.01); *G02B 13/22* (2013.01);
(Continued)

(58) Field of Classification Search
None
See application file for complete search history.

(56) References Cited

U.S. PATENT DOCUMENTS 2,380,210 A  7/1945  Bennett
7,415,136 B2  8/2008  Gallager
(Continued)

FOREIGN PATENT DOCUMENTS

CN   101915755 B   8/2011
JP      5216150 B1   6/2013
WO   2014060562 A1  4/2014

OTHER PUBLICATIONS

Grossman, Gallager, Mitarai; "Continuous Monitoring of Near-Bottom Mesoplankton Communities in the East China Sea During a Series of Typhoons"; J Oceanogr. 71:115-124 (2015).

*Primary Examiner* — Kevin Ky
(74) *Attorney, Agent, or Firm* — Jessica C. Engler; Russel O. Primeaux; Kean Miller LLP

(57) ABSTRACT

The innovative systems and methods described herein use a high-resolution imaging microscope for capturing images of marine microorganisms and particles in situ in an aquatic environment. Using darkfield illumination, high-resolution images may be obtained, capturing features of the microorganism or particle as small as 10 μm in remarkable clarity. Utilizing an open flow-through approach in sample imaging, the delicate structures of the plankton and particles may be imaged completely intact without damage and in their natural orientation. The images can be classified at high accuracy based on physiological and morphological information captured in the image including features as fine as 1 μm. The disclosed classification method utilizes adaptable training sets of taxonomic categories and a novel method of discerning in-focus targets, providing a highly accurate identification system.

14 Claims, 8 Drawing Sheets

(51) Int. Cl.
*A01K 61/90* (2017.01)
*G02B 13/22* (2006.01)
*G02B 27/00* (2006.01)
*G03B 15/03* (2006.01)
*G03B 17/08* (2006.01)
*G06K 9/32* (2006.01)

(52) U.S. Cl.
CPC ......... *G02B 27/0006* (2013.01); *G03B 15/03* (2013.01); *G03B 17/08* (2013.01); *G06K 9/00127* (2013.01); *G06K 9/00134* (2013.01); *G06K 9/00147* (2013.01); *G03B 2215/0575* (2013.01); *G06K 9/3241* (2013.01)

(56) References Cited

U.S. PATENT DOCUMENTS

| | | | |
|---|---|---|---|
| 9,235,048 B2 | 1/2016 | Farr | |
| 2005/0126428 A1* | 6/2005 | Lee | C09D 1/00 106/1.21 |
| 2005/0126505 A1 | 6/2005 | Gallager et al. | |
| 2006/0109484 A1* | 5/2006 | Akamatsu | G01B 11/028 356/613 |
| 2007/0263974 A1* | 11/2007 | Khrushchev | C30B 29/20 385/141 |
| 2007/0275171 A1 | 11/2007 | Dang et al. | |
| 2011/0147245 A1* | 6/2011 | Yim | G03B 17/08 206/316.2 |
| 2013/0314793 A1* | 11/2013 | Robbins | G02B 5/18 359/573 |
| 2015/0363914 A1* | 12/2015 | Boyle | G06T 3/4038 345/629 |

\* cited by examiner

CONTINUOUS PARTICLE IMAGING AND CLASSIFICATION SYSTEM

CROSS REFERENCE TO RELATED APPLICATIONS

This application is the National Stage of International Application No. PCT/US15/51121, filed Sep. 21, 2015, which claims the benefit of U.S. Patent Application Ser. No. 62/053,484, filed Sep. 22, 2014, the disclosure of which is incorporated herein by reference in its entirety. The entire contents of U.S. Pat. No. 7,415,136 "Optical Method and System for Rapid Identification of Multiple Refractive Index Materials Using Multiscale Texture and Color Invariants" and the publication Mitarai et al. (2015) "Continuous monitoring of near-bottom mesoplankton communities in the East China Sea during a series of typhoons" J Oceanogr. 71:115-124 are incorporated herein by reference and without disclaimer.

FIELD OF THE INVENTION

The present invention generally relates to the field of optical imaging. More specifically, this invention is related to the production of darkfield images of light scattering material in aquatic environments for high-resolution imaging.

BACKGROUND OF THE INVENTION

Plankton represent a highly diverse group of marine organisms which occupy a range of depth levels in the water column and are crucial to the marine ecosystem. Microplankton vary in size and include microorganisms as small as approximately 10 µm to 100 µm up to larger organisms such as jellyfish. These organisms generally drift through the water column of the pelagic zone of the oceans or fresh bodies of water by means of the water current or through independent movement. As a group, plankton form the basis of many marine food webs and are an important food source to other marine organisms. Plankton are also critical contributors to nutrient cycling in the ocean. Because plankton are a crucial food source for many marine organisms, the fishery industry is highly dependent upon planktonic organisms as a source of fish productivity. Additionally, plankton studies also assist scientists in understanding the different qualities of aquatic bodies including changes in fish stocks, pollution, and climate.

Previous methods of monitoring these pelagic marine organisms have generally included large-scale ocean surveys that perform collection via nets and sampling bottles in order to quantify the present states of the ocean such as species, life stages, larvae quantities, among other biological aspects. Such methods are most suited collection for robust marine organisms but typically destroy fragile structures such as gelatinous plankton and marine snow particles. Furthermore, abrupt changes to pressure, temperature, and light associated with removal of water from in situ conditions may also have undesirable consequences to the sampled organisms. Additionally, these methods tend to be quite labor-intensive and provide only a highly limited view in time of the sampled marine environment with high variation in the concentration, type, and quantity of microorganisms. The sampling nets or bottles are also unsuited to provide adequate depth information with respect to the plankton populations in the water column since the collected plankton are mixed within the sample.

Methodologies providing non-intrusive techniques (e.g., in situ sampling/measurements) are preferred as there is also substantially less experimental error introduced in the qualification and quantification analysis of the sampled marine microorganisms. In addition, the ability to perform in situ evaluation greatly enhances the experimental data, providing a more accurate perspective into the natural environment without excessive disruption. Therefore, techniques involving in situ monitoring and data collection of microorganisms is highly desirable.

Advances in imaging technology have allowed for greater spatial and temporal resolution of the plankton populations through optical sampling methods. Typical optical systems have struggled in processing the large volume of data and classifying the plankton with reliable accuracy. Moreover, existing imaging devices may disrupt the natural environment with excessive illumination, causing certain species to avoid the light (and imaging), skewing the data of the sampled population.

Beyond the challenges presented by capturing images of these microorganisms are the difficulties in identifying the plankton communities and other aquatic particles. Image identification of plankton samples must balance accuracy, or how well the system compares with traditional methods, with efficiency and repeatability in order to handle large volumes of material. Previous methods to identify and categorize various species of plankton and other microorganisms typically involved individualized analyses; computer identification has often proven to be difficult and less precise than human identification. Therefore, it is highly desirable to provide an inexpensive submersible imaging system capable of high volume and accurate classification analysis which limits the disruption to the aquatic environment.

BRIEF DESCRIPTION OF THE DRAWINGS

The drawings described herein constitute part of this specification and includes an exemplary embodiment of the Continuous Particle Imaging and Classification System, also referred to as CPICS, which may be embodied in various forms. It is to be understood that in some instances, various aspects of the invention may be shown exaggerated or enlarged to facilitate an understanding of the invention. Therefore, drawings may not be to scale.

SUMMARY OF THE INVENTION

Figure 1:
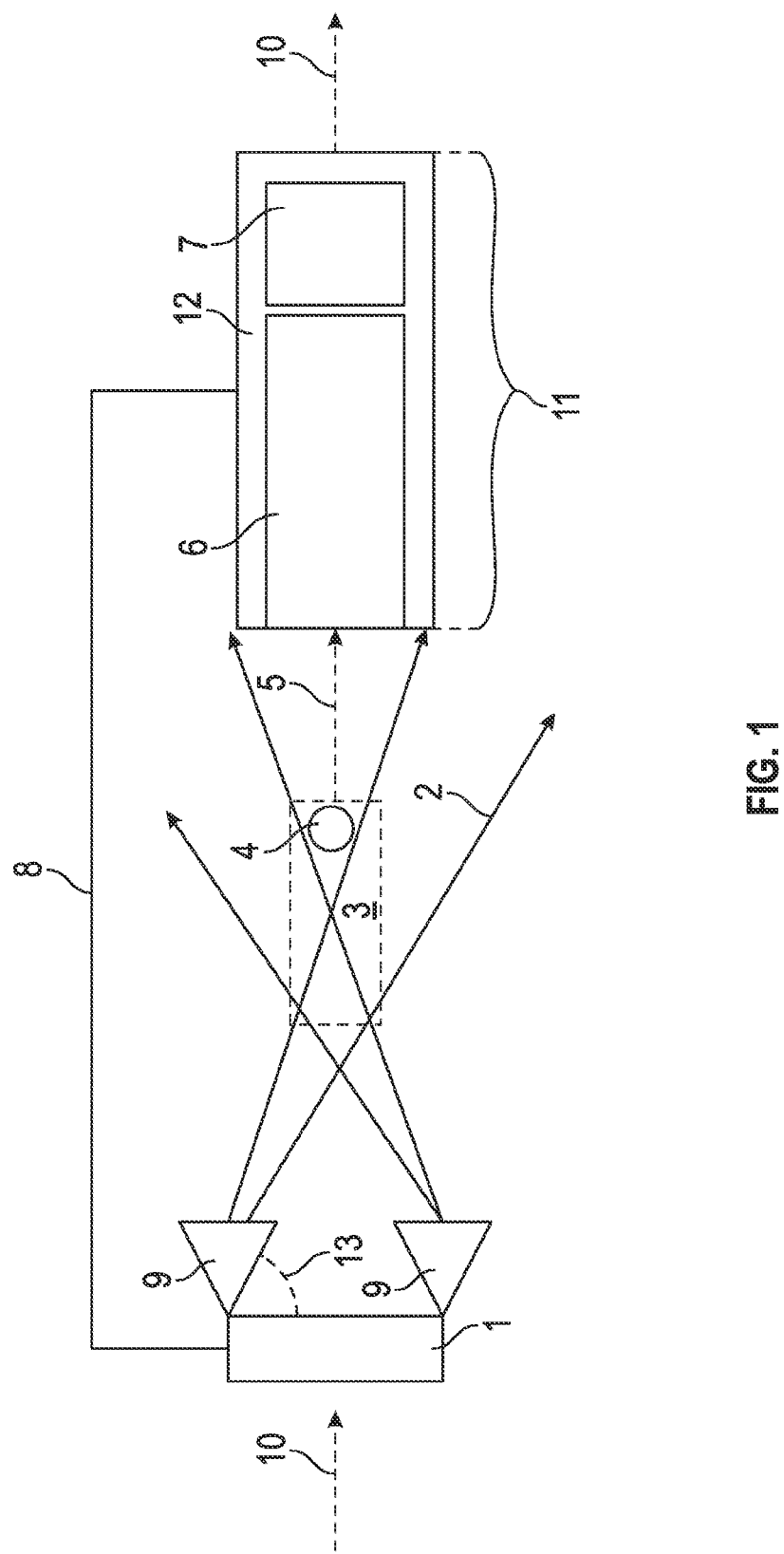
FIG. 1 depicts the continuous particle imaging device comprising the housing, containing the camera, the telecentric lens, the connection means, and the primary light source. Shown by a dotted line, FIG. 1 demonstrates how the light-emitting sources are positioned in such a manner that the light is directed at an angle that does not directly enter the camera lens but instead produces a structured light field. The structured light field intersects and illuminates only the target space (focal volume) of the view of camera lens.

The inventive imaging device and technology allows for the imaging and classification of a plurality of microorganisms and particles in their natural orientation and distribution in relation to the surrounding environment and other organisms. The invention disclosed herein describes the system and methods adapted to provide imaging, quantification, and classification of microorganisms which naturally move through the open, free-flow space disposed in the imaging target space.

It is one object of the present invention to provide a marine imaging device capable of capturing high-resolution images in an aquatic environment (e.g., water, salt water, fresh water, brackish water, water body, surrounding environment) comprising a high-resolution optical system disposed in a housing, a lens with an image face and a defined focal length, a primary light source disposed distal to the image face capable of producing two or more primary light beams wherein said primary light beams do not intersect with the image face, a connection means connecting said primary light source to the housing of the optical system at a distance from said optical system, a target space defined by the intersection of the primary light beams and the lens focal length and capable of accommodating a target to be imaged, and a power source operably connected to said optical system and said primary light source. The primary light beams interact with a target in the target space to produce a secondary light beam which impinges the image face of the lens. The lens is a telecentric lens.

It is another aspect of the invention to provide a target space comprising an open free-flow space (e.g., a space to accommodate targets) to allow targets to flow through said target space and be imaged in their natural orientation and without collection.

The invention discloses a device with a primary light source comprising one or more light-emitting sources capable of emanating primary light beams onto a target. Each light-emitting source emanates light selected from the group comprising monochromatic light, polychromatic light, white light, red light, ultraviolet light, and a combination thereof. The primary light source is capable of intermittent illumination, and the intermittent illumination occurs at a specified rate relative to the camera's exposure duration. In order to provide appropriate illumination for imaging, the primary light source is disposed a distance from the optical system selected from the group of at least or approximately 1 cm, 2 cm, 3 cm, 4 cm, 5 cm, and 6 cm.

The device is capable of submergence in an aquatic environment and may be adapted to image targets at depths selected from at least or approximately 0.5 m, 1 m, 5 m, 10 m, 20 m, 30 m, 50 m, 100 m, 250 m, 500 m, 1,000 m, 2,000 m, and 6,000 m.

Another aspect of the invention discloses a device further comprising an anti-fouling system selected from a primary light source comprising one or more ultraviolet light-emitting sources, a lens with anti-fouling properties adapted to pass undistorted image information through said lens, a mechanical defouling device, and a combination thereof. In one instance, the device comprises a primary light source further comprising one or more ultraviolet light-emitting sources which provide an anti-fouling capacity selected from emitting ultraviolet light intermittently offset in time from the illumination for capturing images, emitting an ultraviolet light dose for a pre-determined length of time, and a combination thereof. In another instance, the device comprises an anti-fouling system comprising a lens with anti-fouling properties such as a coating of colloidal titanium dioxide nanoparticles.

It is another aspect of the present invention wherein the primary light source emanates primary light beams at an angle less than 50 degrees to intersect on a target. In a specific instance, the primary light source emanates primary light beams at an angle of 42 degrees to intersect on a target. When the primary light beams do not impinge a target, said beams are directed toward infinity.

In another aspect, wherein the device is disposed in an aquatic environment and secured to a platform selected from an autonomous underwater vehicle (AUV), a remotely operated vehicle (ROV), a glider, a profiler, a submarine, a mini submarine, a human operated vehicle (HOV), a mooring, a buoy, a float, an off-shore station, and a watercraft for towing said device.

The present invention also provides a method for producing darkfield images in situ of targets in an aquatic environment comprising the steps of providing an assembly comprising an optical system with a telecentric lens incorporated with a high-resolution camera and disposed in a watertight housing, connecting an primary light source capable of intermittent illumination a distance away from the lens by a connection means, wherein the primary light source is positioned to emit primary light beams which do not impinge said lens, placing said assembly and said primary light source in an aquatic environment, allowing water comprising a target to be introduced between said assembly and said primary light source, emanating two or more primary light beams from the primary light source to impinge the target, and using the camera to capture digital images and data of the light beams directed off of the target. The method further comprises the step of communicating the digital images and data to a storage device disposed within said assembly. The digital images and data may be utilized to analyze and classify the targets imaged by the camera. The digital images and data may be transmitted from the storage device to another location selected from a vessel, a vehicle, a land-based facility, a buoy, a mooring, a server, and a website.

The disclosed method also includes providing an assembly capable of continuously imaging targets in the aquatic environment and adapting the optical system to image the target and store the digital image and data of the target only once.

The invention also discloses a method of classifying targets contained in darkfield images comprising the steps of checking each darkfield image for sufficient quality for analysis, placing a bounding box around the image with a user-defined expansion factor, writing the pixels of the image to a specified location of a storage device to produce a high-resolution image, using a focus parameter to subtract a smoothed image from the original image, and comparing the resulting image to the categories of species that have been classified by the user. The classification of the images is performed automatically.

Definitions

Continuous Particle Imaging and Classification System. As used herein, this expression including "continuous particle imaging device" or "particle imaging device" or "CPICS" may be used interchangeably to refer to the inventive in situ imaging system in its entirety.

Target. The object of interest present in the surrounding (e.g., aquatic) environment capable of being imaged by the present invention. The space surrounding the "target" may be referred to as a "region of interest" or "ROI". In many embodiments, the target is a marine organism, in particular a microorganism or particle present in environment. The primary requirement of the target is that it is capable of passing though the target space for imaging by the optical system and is detectable by the optical system. In many embodiments, it is intended, although not required, for the target to be of a size suitable for imaging within the target space, typically in the size range of at least 1 µm, preferably 10 µm to about 10 cm.

Platform. The platform is the vehicle or structure on which the continuous particle imaging device is mounted. The platform may be stationary or mobile, such as a structure (e.g., an underwater observatory node, a mooring, a buoy, a drifting buoy, a float, a CTD rosette (e.g., conductivity/temperature/depth sensor), a tripod, a mount), a vehicle (e.g., an autonomous underwater vehicle (AUV), an unmanned remotely operated vehicle (ROV), a human occupied vehicle (HOV), a glider, a kayak (e.g., Jet Yak), a submarine, a mini submarine), or towed body towable by a vehicle, vessel, diver, or other suitable means.

Optical System. The optical system provides the means to manipulate the light path and properties thereof and to facilitate the imaging of the target of interest. The system is capable of producing high-resolution images of targets in motion or stationary when said targets are disposed within the target space. In general, the optical system comprises a camera, a lens (e.g., a telecentric lens), a housing (e.g., water-tight, pressure-resistant), and components necessary to process the imaged targets including an image processor and a computer. In many embodiments, the particle imaging device employs a high-resolution optical system wherein the optical system is capable of imaging fine features of a target often as small as 1 µm at an image quality suitable for image processing and classification by the disclosed methods.

Camera. The optical system comprises a camera capable of high-resolution (e.g., high quality) imaging of targets potentially in motion. Although any suitable camera may be employed with the present invention, some preferred embodiments include a camera adapted to operate in an aquatic environment with various environmental conditions and produce images of targets at a quality suitable for accurate classification.

Lens. The lens is a transparent substance or material capable of receiving certain light beams (e.g., secondary light beams) and directing and/or focusing the light beams in a manner to allow the components of the optical system to receive and manipulate said light beamss to produce an image or data. In many embodiments, the lens is a telecentric lens wherein only scattered and diffracted light, which is being redirected by a target that comes between the primary light source and the lens within the target space, enters the lens. Zero order light, or light that does not intersect any target, is directed to infinity. In normal operation, a target present within the target space will reflect, deflect, or refract light emanating from the primary light source, to produce secondary light rays which impinge on the distal lens surface (e.g., the image face) of lens, such that the optical system (e.g., the camera) may generate images of the target.

Target Space. In general, the target space is defined as the space capable of accommodating a target for imaging, often as an open, free-flow (e.g., multi-directional flow) space, wherein targets present in the surrounding environment typically may enter, be introduced, move through without deterrence and, in most embodiments, without force (e.g., pumping), and are imaged by the optical system. In the target space, the primary light beams produced from the primary light source intersect/converge and may impinge a target disposed in this space to produce secondary light beams (e.g., light scattering) which are received by the lens to generate an image.

Path Length. As used herein, the term refers to the overall distance between the primary light source (e.g., light array) and the optical system (e.g., the image face of the lens). In some embodiments, the connection means defines the path length, positioning the primary light source a distance from the optical system. In many cases, the path length may be adjusted to provide a distinctness or clarity of an image rendered by an optical system (e.g., in-focus) imaging of targets within the target space.

Focal Distance. The focal distance, also "focal range" or focal volume" refers to the overall length between the distal face of the lens and its point of focus. At the point of focus, a target may produce secondary light beams to impinge the image face of the lens and provide an in-focus image of the target.

Primary Light Source. The primary light source provides the means of illumination for the optical system to produce images of targets wherein the primary light source is comprised of one or more suitable light-emitting sources capable of producing light beams to impinge a target in the target region to produce secondary light beams. More specifically, the preferred primary light source is adapted to produce a suitable amount of secondary light beams through an aquatic environment for imaging a target. The positioning of primary light source is constrained that in normal use in the absence of a target within the focal range or target space of the lens, the preponderance of light beams from the primary light source does not impinge on the distal face of the lens.

Structure. In many embodiments, the primary light source is mounted on the structure or appropriate mounting surface to secure the light-emitting sources of primary light source at the appropriate orientations to illuminate targets in the target space. The light source and structure may be collectively referred to as the light array (e.g., LED array) and are generally located beyond the focal distance of the lens. In many embodiments, the structure allows the light-emitting sources to be positioned at one or more angles directed toward the central imaging axis in order to produce primary light beams which do not impinge the distal face of the lens.

Housing. Referred to herein as the "housing" or "camera housing", this component fits or otherwise securely mounts the optical system and associated components within the internal space of the housing. In many embodiments, the housing is intended to protect the optical system and to withstand the pressure forces exerted by the surrounding environment which may vary depending upon the depth of desired deployment of the inventive particle imaging device. In many cases, the housing is designed to resist degradation from external forces such as water, salt, dust, and other environmental and circumstantial conditions. The housing is typically connected to the primary light source via the connection means wherein a space (e.g., target space) is disposed between the primary light source and the housing.

Anti-Fouling System. A means to reduce, prevent, clean, and/or remove the build-up of microscopic and macroscopic organisms, referred to as bio-fouling, from a surface(s) exposed to the surrounding environment such as the primary light source, the distal face of the lens, or any specified surface of the present invention.

Connection Means. The means to mount, secure, or otherwise orient the primary light source (e.g., light array) at the suitable distance and orientation from the optical system. The connection means is designed to not detrimentally affect the required rate of fluid movement through the target space and at a minimum will connect at one point to the optical system or its housing and at one point to a primary light source (e.g., the light array) in such a way as to not interfere with illumination of the target space, or the optical pathway necessary for image production.

Central Imaging Axis. This axis may be defined by an imaginary line passing through the center of the lens and propagated through the device.

Primary Light Beams. The primary light source is configured in a suitable orientation to emit primary light beams (e.g., primary light rays) of a desired wavelength(s) to emanate into the focal volume and intersect (e.g., converge) on a target. In most embodiments, the primary light rays intersect within the target space but do not impinge on the distal face of the lens.

Secondary Light Beams. Secondary light beams (e.g., secondary light rays) are generally characterized as the redirected light beams generated when the primary light beams are reflected, deflected, refracted, or altered in their projected path by a target. The secondary light beams may then impinge the distal face of the lens and contribute to the imaging of said target by the camera of the optical system.

Storage Device. The storage device provides the means for storing the raw, processed, altered, etc. images and necessary forms of data acquired or programmed in the continuous particle imaging device. Any suitable means for storing said data may be employed including a hard drive(s), a solid state drive(s), or similar system as deemed fit by one skilled in the art. Said storage device may by connected (e.g., in communication) with the image processor or onboard computer and/or another location. In most embodiments, the storage device is capable of transmitting the stored images and/or data to another location (e.g., vessel, vehicle, land-based facility, buoy, mooring, server, website) via a wired (e.g., fiber optic, high-speed, Ethernet) or a wireless (e.g., satellite) connection. In some embodiments, the storage device also stores metadata (e.g., position, orientation, depth, time, crystalline material, transparency, etc.) related to each imaged target (e.g., ROI).

Ethernet Interface. As used herein, the Ethernet interface refers to the connectivity with the optical system. Typical Ethernet connection speeds range from 2 megabits per second to 10 gigabits or more. The Ethernet interface may be directly incorporated with the continuous particle imaging device or provided through an external source including, but not limited to, a towed vehicle, a CTD rosette, a cabled observatory, or a mooring. In several embodiments, the Ethernet interface can be controlled from a vessel or from shore through custom software and a configuration file that contains the operating information.

DETAILED DESCRIPTION OF THE ILLUSTRATED EMBODIMENTS

The subject matter of the present invention is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies.

Furthermore, the described features, structures, or characteristics may be combined in any suitable manner in one or more embodiments.

The invention describes a plankton and particle in situ microscopic imaging system that produces crisp darkfield images of light scattering material in aquatic environments. The system and methods are appropriate for imaging and categorizing ultra-fine materials having a similar color, shape, and features that are difficult to identify through conventional imaging methods due to a lack of distinguishing characteristics of the imaged target. Such features include structures which may be transparent, opaque, delicate (e.g., about 1 µm), and crystalline, among other aspects which are difficult for adequately capturing high quality images and providing high accuracy classification.

Particular advantages of the present invention include providing a small particle imaging device often capable of being hand-held for allowing easy transportation. The device usually allows open flow through the target imaging space which permits the imaging of plankton and particles in their natural orientation, in undisturbed predator-prey interactions, and without damage. The present invention use a novel optical system capable of providing high-resolution color information which is a particularly key aspect to increasing the accuracy of plankton identification. Additionally, the imaging device is easy to operate, automatically quantifying the individual organisms and populations of the imaged targets and performing size measurements of the targets. The resulting data may be easily analyzed to provide a plurality of plots such size distribution over time, population counts, among others. Of particular interest is the speed of the particle imaging device which acquires new results (e.g., images, data, classification results) several times every second (i.e., real-time).

The high-resolution machine vision camera depicted in FIG. 1 operates at a variety of frame rates limited only by the speed of the connection of the camera to the image processor. The high-resolution machine vision camera is coupled with an advanced telecentric lens system and a structured lighting system (e.g., a light array, an LED array) for illumination purposes. The camera also generally incorporates the use of an Ethernet interface with the image processor to allow connectivity using high speed communications to transmit the images and data to another location.

The use of a telecentric lens 6, which is contained in the camera housing 7, schematically depicted in FIG. 1, is designed to produce maximal depth of field (DOF), at the same magnification throughout the entire space of the focal distance (e.g., focal volume). This allows the targets to be measured much more accurately than with a traditional lens. The telecentricity also removes any barrel distortion at the corner of the image that would disturb normal lenses and decrease reliability of image classification.

The inventive particle imaging device further comprises one or more primary light sources 9 disposed relative to a central imaging axis 10. The light sources 9 are often configured in an array with beam angles such that their emitted primary light beams 2 travel across all or part of the focal length of a telecentric lens without directly impinging the lens 6. The positioning of the primary light source 9 has a further constraint that in normal use in the absence of targets 4 within the focal distance of the lens 6, the preponderance of light beams 2 from the primary light source 9 do not impinge on the image face of the lens 6. The region of space in which the light beams 2 intersect the focal distance, or focal volume, of the lens 6 is defined as the target space 3. In most embodiments, the primary light rays 2 converge and/or intersect within the target space 3.

Figure 2:
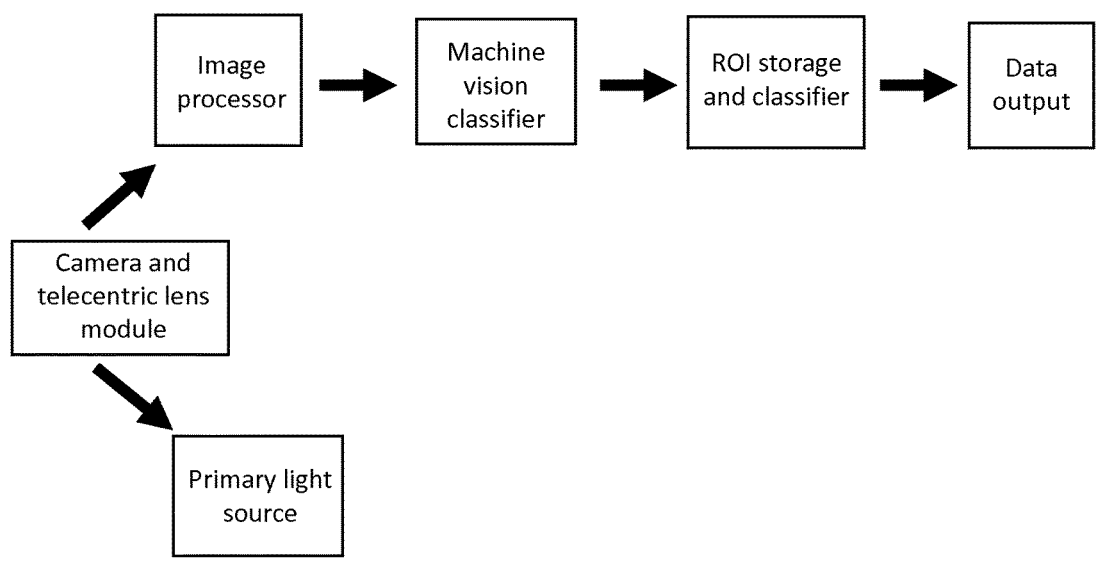
FIG. 2 depicts a schematic of the imaging process according to one illustrated embodiment.

As shown in FIG. 2, the camera and lens module of the optical system is in communication with the primary light source and the image processor to coordinate the illumination (e.g., strobing, intermittent illumination) of the target and the capture of the target's image for processing via the image processor. The data from the image processor is provided to the machine vision classifier and then to the ROI storage and classifier (e.g., storage device) module to produce a data output. The data output may be stored onto an internal storage device and/or transmitted to another location such as a vessel, facility, server, or website.

Targets of Interest

Figure 4:
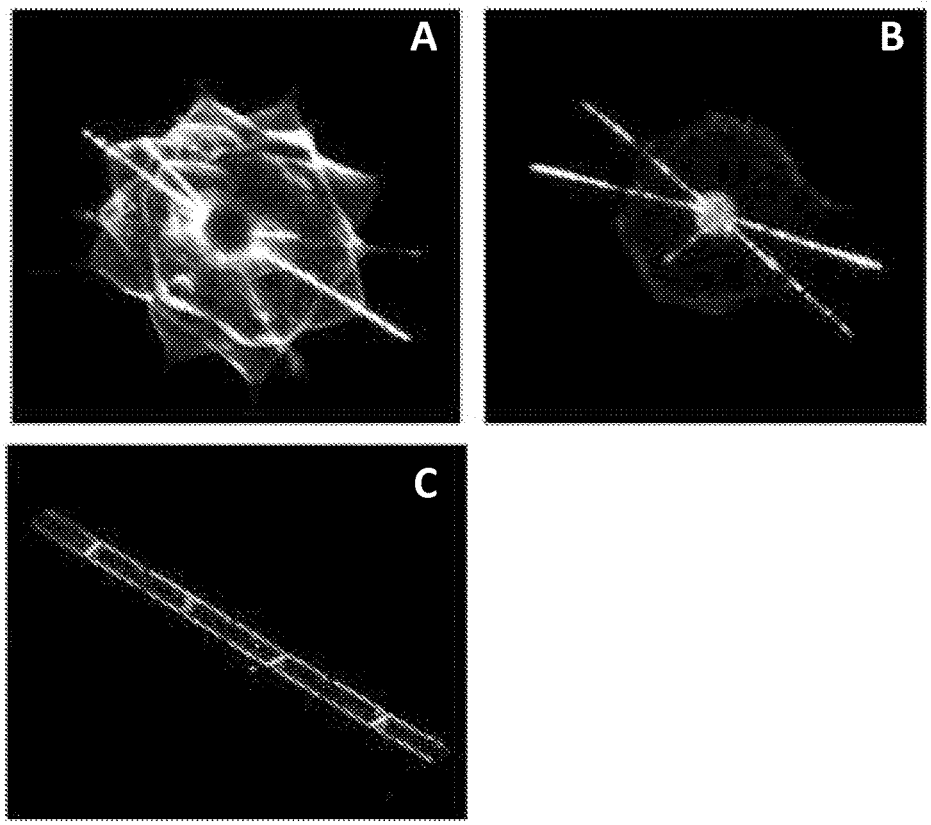
FIG. 4 depicts three images captured by the continuous particle imaging device including (A) a single cell amoeboid protozoa (*Acantherioma* sp., size: ~55 µm), which builds its skeleton from celestite (strontium sulfate) and is very sensitive to acidification, (B) a radiolarian (diameter ~50 µm) which is very abundant upwards of 100 individuals/L, and (C) a diatom *Rhizosolenia* sp. (Bacillariophyceae, diameter: ~20 µm).

The present invention provides a submersible imaging system capable of high-resolution imaging of targets disposed in an aquatic environment (e.g., salt water, fresh water, brackish water, water column, liquid medium). Because many of the targets are very fragile and possess delicate crystalline spines or other fine features (as shown in FIG. 4), they are typically not well-imaged or disposed in their natural orientation when captured in an enclosed chamber or other collection means. A particular feature of the present invention is the free-flowing open space, the target space 3, wherein the targets 4 are imaged without damage (e.g., without contact, without collection), allowing high quality imaging of even the most delicate and fragile species, such as the *Acantharia*.

Such targets include, but not limited to, microorganisms such as algae, diatoms, plankton (e.g., phytoplankton, holoplankton, meroplankton, zooplankton), Coccolithophores, pteropods, dinoflagellates, Acantharia, Echinoderm larvae, Foraminifera, radiolaria, larvae (e.g., invertebrate larvae animals), bacteria (e.g., cyanobacteria, Trichodesmium), protozoa (e.g., coral, Bryozoa, rotifers, sponges, polchaete worms), jellyfish (e.g., hydromedusae, gelatinous organisms, osmoconformers), ctenophores, tunicates (e.g., salp), small crustaceans (e.g., copepods, Brachiopods, Remipedia, Cephalocarida, Maxillopoda, Ostracoda, Malacostraca), Chaetognatha, fishes, larval fishes, particles (e.g., dissolved organic material, inanimate fragments, marine snow, microscopic materials, detritus, dead particulates, biomass), or any suitably sized microorganism or particle.

In general, any target 4 (e.g., ROI, organism, or particle) disposed within the open space of the imaging region, specifically the target space 3, may be imaged by the present invention. Such targets include those of a size less than 1 µm, 5 µm, 10 µm, 1 µm to 10 µm, 10 µm to 50 µm, 10 µm to 100 µm, 10 µm to 200 µm, at least 100 µm, at least 500 µm, at least 1 mm, up to 5 mm, up to 10 mm, 10 µm to 10 mm, up to 100 mm, up to 1 cm, up to 5 cm, 1 µm to 10 cm or more. Features of the target 4 are fine as 1 µm (and in some cases, less than 1 µm) may be imaged by the device.

Light Sources

The light source 9 provides the necessary illumination for the imaging device. In most embodiments, a primary light source 9 is mounted on a structure 1, collectively referred to as the light array, which is attached to the optical system 11 or its housing 12 by a connection means 8 (FIG. 1). The structure 1 and the primary light source 9 are generally located beyond the focal distance of the lens 6. In normal operation, target 4 within the target space 3 will reflect, deflect, refract, or direct light emanating from the primary light source 9, causing redirected "secondary" light beams 5 to impinge on the distal surface (e.g., image face) of lens 6, such that the camera 7 may generate images of the target.

The primary light source 9 is comprised of one or more light-emitting sources capable of generating primary light beams to impinge a target 4 in the target space to produce one or more secondary light beams 5. More specifically, the preferred primary light source 9 is adapted to produce primary light beams 2 through (e.g., in) an aquatic environment. In one embodiment, the primary light source 9 is selected to produce a suitable amount of light for imaging (e.g., observing) a target 4 in its natural environment with relatively little to no disturbance to the surrounding environment.

In some embodiments, the primary light source 9 generates monochromatic (e.g., single wavelength or single color light), polychromatic (e.g., 2 or more wavelength light or multiple color light), or white light according to the needs of use. Preferred primary source wavelengths include 300 nm to 800 nm, 380 nm to 760 nm, 100 nm to 400 nm (ultraviolet light), 300 nm to 400 nm (blue-green electromagnetic spectrum), 600 nm to 700 nm (red electromagnetic spectrum), 600 nm to 800 nm, visible light, and infrared light, however, any suitable wavelength light may be used to with the primary light source 9. In some embodiments, red light is employed in the primary light source 9 which is less visible to microorganisms and prevents aggregation of the plankton swarming about the light array. This may be a considerable issue in certain environments and may potentially skew imaging and quantitation. In one embodiment, the primary light source 9 is comprised of one or more red light-emitting sources. In further embodiment, the primary light source 9 is comprised of a combination of one or more red light-emitting sources and one or more white light-emitting sources (or other desired wavelength(s)).

In many embodiments, the primary light source 9 is comprised of one or more light-emitting diodes (LEDs) but may be any suitable light-emitting sources as known in by one skilled in the art. In one embodiment, the primary light source 9 is an LED array comprised of numerous high output LEDs (e.g., 2 LEDs, 10 LEDs, 20 LEDs, 50 LEDs, 70 LEDs, 100 LEDs, 150 LEDs, 200 LEDs, 250 LEDs, up to 300 LEDs, up to 400 or more LEDs) arranged in a configuration optimal for optical system 11 such that the LED array light output converges in the defined target space 3 in a region between the array and the lens. In one aspect of this embodiment, the light from the LED array is monochromatic in the blue spectrum. In another embodiment, the LED array generates red light or white light or a combination thereof, if color imaging is required.

Each LED may be disposed in a casing for mounting to the structure 1. In some embodiments, the casing is comprised of anodized aluminum. Each LED may be secured within their casing using an adhesive such as potting or other suitable sealant to adapt the light sources for the aquatic environment.

The described primary light source 9 may be arranged to provide a conservative use of light to avoid deterring organisms away from the target imaging space 3. In many embodiments, the light output from the light (e.g., LED) array is strobed in synchrony with or at a specified rate relative to the camera's exposure duration (e.g., in phase with each frame of the camera) to provide an image that is free of motion artifacts even when the invention is in motion or being towed at high rates of speed. In one embodiment, the strobe provide a pulse length of light of 5 µs. In other embodiments, the strobe pulse length is specified to be approximately 1 μs, 2 μs, 3 μs, 4 μs, 6 μs, 7 μs, 8 μs, 9 μs, 10 μs, or longer depending on the camera's exposure time.

In some instances, the lens 6 will detect light emitted from targets 4 within the target space 3. Examples of such emitted light include natural or induced fluorescence, autofluorescence, or bioluminescence. For the purposes of this description, such emitted light is also considered to be "secondary" light due to its origination from a secondary light source (other than light source 9). Primary light from source 9 never reaches the camera lens 6.

The structured light source comprising the array of lights may be configured in any useful way. In one embodiment employing LEDs, the light sources are arranged in a circular configuration in which the diameter of the array (e.g., the structure 1) is approximately the same size or larger than the size of the camera housing 12. In another embodiment, the diameter of the array is smaller than the size of the camera housing 12. In another form, the diameter of the array is smaller or larger than that of the lens 6. Provided the focusing of the LED beams produces an adequate target space 3, non-circular LED array configurations may be used, including elliptical, trapezoidal, parallel piped, triangular, rectangular, etc. In some embodiments, one or more primary light sources 9 are configured lateral to the target space 3.

Figure 3:
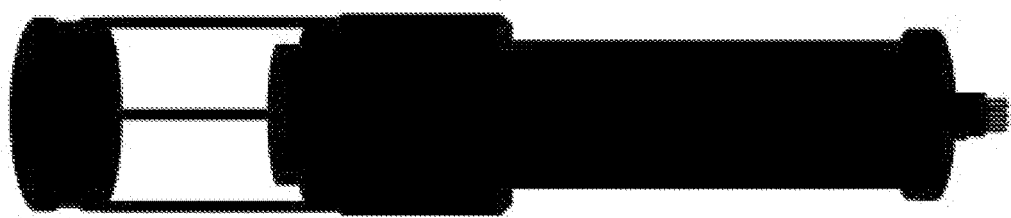
FIG. 3 shows an illustrated embodiment of the continuous particle imaging device.

The structure 1 provides the surface to which the light-emitting sources are mounting and is typically attached to the outer surface of the housing 12 of optical system 11, to the outer face of the lens 6, or any suitable region of the particle imaging device by a connection means 8 (described in more detail below). The structure 1 may be any suitable shape useful for mounting the light-emitting sources particularly at suitable angles (e.g., angle 13, FIG. 1) to direct the primary light beams 2 to illuminate the target 4 without providing additional light directly to the lens 6. In some embodiments and shown in FIG. 3, structure 1 is a circular (e.g., spherical, round) mounting surface; in further aspects of this embodiment, the light-emitting sources are arranged in a circular configuration. In some cases, structure 1 is an annular or ring shape (e.g., illumination ring) with a cylindrically hollow center (e.g., o-ring), the light sources may be arranged about the diameter of the ring. In other cases, structure 1 is a disc shape wherein the light sources may be arranged in any suitable manner about the planar surface of the disc. In other embodiments, the structure 1 is of an elliptical, trapezoidal, parallel piped, triangular, rectangular, horseshoe, etc. form.

Structure 1 may be comprised of any suitable material capable of submergence in water and resistant to deformation at at least the minimum desired depth of deployment of the particle imaging device. Such materials may include, but are not limited to, steel, stainless steel, thermoplastics, plastics, natural or synthetic polymers (e.g., delrin), or any appropriate material known in the art.

In order to provide proper beam direction, the structure 1 may comprise mirrors (e.g., semi-mirrored surfaces) to direct the light rays produced by the primary light source 9. In some embodiments, shown in FIG. 1, structure 1 comprises one or more mirrors disposed at an angle 13 to direct the light rays wherein the angle 13 is typically less than 50 degrees from the central imaging axis 10, preferably less than 45 degrees, more preferably about 42 degrees, or less than 40 degrees (e.g., 32 degrees). In further embodiments, the mirror(s) mounted on structure 1 are used to direct (e.g., internally reflect) the primary light beams 2, in particular the ultraviolet light rays, to beam onto the primary light source 9 as a means to prevent bio-fouling on the light source 9. Such angling of the mirrors may be optimal as the traveled path length of the ultraviolet light is minimized through the aquatic environment, meaning that less of the light is being absorbed (e.g., attenuated) and more is directed to hit the primary light source 9.

The beam angles of the primary light source 9 are configured so that the emitted light beams intersect the focal volume of the lens 6 but do not enter the camera lens 6 (in the absence of a refracting or reflecting object). This configuration results in the lens 6 generally receiving only secondary light 5 from the interaction of the primary light beams 2 with target 4 within the target space 3. Preferred beam angles of the primary light source 9 relative to the rest of the optical system and the central imaging axis 10 that will lead to the optimal generation of secondary light 5 to be received by the lens 6 depend upon a number of factors. These factors include: the distance between the distal face of the lens 6 and the primary light source 9, the dimensions and location of the focal volume for the lens 6 being used, and the location of the primary light source 9 relative to the image face of the lens 6.

In preferred embodiments, the primary light source 9 will only illuminate those targets 4 in the in-focus volume (i.e., the target space 3) at angles less than 50 degrees, more preferably less than 45 degrees, more preferably 42 degrees, and in some cases less than 40 degrees and about 32 degrees relative to the central imaging axis 10. In another embodiment, the primary light source 9 provides illumination to the target space 3 at more than one angle; in some embodiments featuring LEDs, the primary light source 9 is configured with 5, 10, or more than 20 different angles. In still another embodiment, the beam angle of one or more of the light-emitting sources of the primary light source 9 is adjustable (e.g., manually, electronically, automatically). In one aspect of this embodiment, the beam angles of the light-emitting sources of the primary light source 9 are programmable and controlled by a microprocessor or computer, located within the camera.

As described in more detail below, the primary light source 9 may also comprise an anti-fouling system to prevent the build-up of bio-fouling on the optical surfaces (or any desired surface of the device) including the light array, the distal face (e.g., window) of the lens 6, or optical window of the optical system 11. Although any suitable anti-fouling system deemed appropriate by one skilled in the art may be used, preferred anti-fouling systems include utilizing a primary light source 9 comprising one or more ultraviolet light-emitting sources, a mechanical defouling device, a lens with anti-fouling properties, and a combination thereof.

In some embodiments, the present invention employs a primary light source 9 comprised of a plurality of light-emitting sources, in particular LEDs, wherein a portion of the plurality of LEDs is selected to emit ultraviolet light. In further embodiments, approximately for every 3-4 light-emitting sources used for imaging illumination, an ultraviolet LED is incorporated into the primary light source 9. In another embodiment, at least one-third of the light-emitting sources emit ultraviolet light. In one embodiment, at least one-half of the light-emitting sources emit ultraviolet light. In another embodiment, two-thirds or more of the light-emitting sources emit ultraviolet light.

In some embodiments, the primary light source 9 comprising one or more ultraviolet light-emitting sources provides an anti-fouling capacity using emitted ultraviolet light directed to radiate on select regions of the device including the primary light source 9 and any optical windows of the optical system 11. In cases where the primary light source 9 strobes the light-emitting sources intermittently for imaging in synchrony with the frame-rate of the camera 7, the ultraviolet light-emitting sources may strobe intermittently offset in time from the imaging illumination.

In another embodiment, the primary light source 9 comprises ultraviolet light-emitting sources which radiate a dose (e.g., duty cycle) of ultraviolet light to prevent bio-fouling. The optimal dose of ultraviolet light may be dependent on the specific environment including the types of plankton and/or particles present, the depth of deployment, and the radiation wavelength, among other factors as described in the field and in the U.S. patent application Ser. No. 13/940,814, incorporated by reference in entirety. In some aspects, the ultraviolet wavelength is between 200 nm and 300 nm, preferably between 240 nm and 295 nm, and in some cases 265 nm and 295 nm, 265 nm, 295 nm, and any suitable wavelength or range of wavelengths determined to prevent bio-fouling on the inventive device. The ultraviolet radiation may be emitted for a specific amount of time, at a predetermined time, when bio-fouling is detected on the optical windows or other surfaces (e.g., bio-fouling sensor), and a combination thereof.

As known in the art, identifying a completely transparent anti-fouling treatment on windows, mirrors, or other desired surfaces that are required to pass undistorted image information has been elusive. In other instances, the optical windows, such as the lens 6, comprise anti-fouling properties such as a coating of colloidal titanium dioxide ($TiO_2$) nanoparticles suspended in a silicon solution on its optical windows and primary light source 9. In addition, a series of high output ultraviolet light-emitting sources (e.g., LEDs) contained in the primary light source 9 are directed at the optical window (e.g., lens 6) with $TiO_2$ coating. The ultraviolet light induces the release of hydrogen peroxide ($H_2O_2$) from the surrounding water and the $TiO_2$ coating, providing a continuously ablating anti-microbial surface. Moreover, the photo-induced superhydrophilicity created on the optical window surface provides a secondary mechanism for release of bio-fouling organisms and particles. Additionally, any anti-fouling coating, paint, resin, or treatment that does not degrade the imaging capacity of the continuous particle imaging device may be used.

In other embodiments, a mechanical defouling system may be employed, including a wiper, a scrubber, or similar means. In some embodiments, a diver may perform a manually cleaning of the bio-fouled surfaces.

Connection Means

The primary light source 9 and structure 1, i.e., the light array, is connected to the optical system 11 or its housing 12 with a connection means 8. The connection means 8 will not detrimentally affect the required rate of fluid movement through the target space 3, whether by passive transmission, active diffusion, or with a pumping means. The connection means 8 at a minimum will connect at one point to the optical system 11 or its housing 12 and at one point to the light array, in such a way as to not interfere with illumination of the target space 3, or the optical pathway necessary for image production. Connecting the camera housing 12, containing the camera 7, and the primary light source 9 in this manner allows the water containing marine microorganisms to flow freely between the camera lens 6 and the primary light source 9. Rigid connection means such as rods, meshes, plates, tubes, and the like are preferred comprised of any appropriate material including, but not limited to, steel, stainless steel, steel alloy, aluminum, aluminum alloy, plastic (e.g., thermoplastic), fiber glass, or other firm materials.

In some embodiments, one or more connectivity rods (e.g., 1, 2, 3, 4, 5, 6, 7, 8, 9, 10, or more rods) are used as the connection means 8. In one embodiment, four rods hold the light array in its proper position away from the camera lens 6. In another embodiment, the camera 7, the lens 6, and the light array are incorporated directly into or onto an underwater vehicle with no other mechanical connectivity required. In a similar embodiment, the camera 7, the lens 6, and the light array are incorporated directly into an underwater observatory (e.g., node) and require no addition connection means 8.

In many embodiments, the connection means 8 defines the distance between the primary light source 9 and the optical system 11 (e.g., the lens 6), also referred to as the path length. In general, this distance may be adjusted to fit the components of the optical system 11. In some embodiments, the primary light source is disposed a distance from the optical system including distances of less than 1 cm, about 2 cm, 3 cm, 4 cm, 5 cm, 6 cm, 8 cm, 10 cm, 12 cm, 15 cm, 20 cm, up to 50 cm, up to 100 cm or more.

Optical System

The continuous particle imaging device comprises an optical assembly capable of producing high-definition color images of targets at high speed, and in many embodiments while in motion. In order to accurately determine classification and quantification, the optical system used must be capable of recording each target only once. The optical system 11 including a camera 7, a lens 6, a housing 12, and/or other optical components for manipulating the light path and properties thereof to facilitate the imaging of the target of interest. The optical system 11 arrangement defines a specific geometry to employ the high-resolution imaging of the continuous particle imaging device dependent upon the telecentric lens 6. Only scattered, diffracted, or redirected light, which is being passed on by impingement of the plankton and other microorganisms or particles that come between the primary light source 9 (e.g., the LED array) and the camera lens 6, enters the camera lens 6. Zero order light, or light that does not intersect any target 4, is directed to infinity. In many embodiments, the light output from the light array is strobed in synchrony with the camera's exposure duration to provide an image that is free of motion artifacts even when the invention is towed at high rates of speed.

The imaging of targets 4 is facilitated by a suitable camera comprising the capacity to produce high-resolution images of targets potentially in motion. The camera is generally adapted for operation in a variety of conditions including temperatures ranging from −5° C. to 40° C. (and perhaps exposure temperatures ranging from −20° C. to 65° C.), pressure from depths down to 6,000 m or more, rough handling, and so forth. In instances where the continuous particle imaging device is mounted on a vehicle or other platform dependent upon battery power, the camera preferably operates at a low power consumption (e.g., less than or approximately 10 W, 8 W, 6 W, 4 W, 3 W, 2 W, 1 W, or less at 12 V) to extend the length of time of deployment. Another consideration when deployed on a vehicle or platform is that the camera weight be minimized (e.g., less than or approximately 5 lbs, 3 lbs, 1 lb, 500 g, 400 g, 300 g, 200 g, 100 g, or less).

In many embodiments, the optical system 11 is operably connected to a power source which provides adequate power to operate the electronics of the particle imaging device. The power source may, in some aspects, also be connected to the primary light source 9. In other embodiments, the primary light source 9 comprises a separate power source for providing the lighting. The power source may be integrated into the housing 12 of the optical system 11 or disposed externally to the housing 12. In some cases, the power source is provided by the attached platform wherein the particle imaging device is suitably connected to the platform to deliver power for the optical system 11 and/or the primary light source 9 in addition to any other related components which require power.

In many embodiments, the camera 7 operates at approximately 20 Hz/s (e.g., frames per second, images per second). In other embodiments, this frame rate is up to or approximately 5 Hz/s, 10 Hz/s, 20 Hz/s, 30 Hz/s, 40 Hz/s, 60 Hz/s, 100 Hz/s, 200 Hz/s, or more as deemed appropriate by the user of the particle imaging device. In some embodiments, the optical system 11 generated full-frame images at 6 to 10 Hz/s.

The optical window(s) of the optical system 11 may be any suitable material including glass, acrylic, fused silica, or the like as known by those in the art, preferably with minimal interference or distortion of the light (e.g., scattered light) being received from impinging the target 4. The optical window(s) are designed to be a thickness suitable to withstand the pressure or environmental conditions when in operation without failure or infiltration of fluid from the surrounding environment. In some embodiments, the optical window(s) (and the housing 12) are rated to perform to depths at least or approximately 0.5 m, 1 m, 5 m, 10 m, 20 m, 30 m, 50 m, 100 m, 250 m, 500 m, 1,000 m, 2,000 m, 6,000 m, 11,000 m, or full ocean depth.

The frame rate of the optical system 11 defines the strobe rate and by carefully selecting the strobe duration, image blurring of moving targets 4 within the target space 3 can be minimized or avoided. Strobing may be programmed to occur as fast as the primary source lighting 9 and underlying electronics can be made to handle. Strobe duration (e.g., microseconds, milliseconds) is generally controlled by a strobe trigger.

Another factor which generally limits strobe rate is the capacity of the data connection between the camera 7 and the image processing computer (e.g., image processor). Typical connection speeds range from 2-megabits per second to 10-gigabits per second or more. In one embodiment, a 1-gigabit per second connection is used to support frame rates of up to and including 19-frames per second. The use of faster connection speeds enables either or both of more frames per second or increased pixel number or bit depth.

The present invention utilizes a lens or lens assembly with a defined focal length suited to provide high-resolution images with the employed optical system 11. As the primary light beams 2 impinge the target 4, secondary light rays 5 are produced and pass through the distal face of the lens 6 before entering the camera 7. The lens 6 is finely positioned and secured through the use of attachment members (e.g., fasteners, screws, bolts, retainers, rings, fixtures) and a suitable lens mount as know by one skilled in the art.

In many embodiments, the system 11 comprises a telecentric lens, meaning the magnification of the target 4 (i.e., the image size) is independent of the distance of the camera 7 which allows high-resolution images and accurate size measurements (e.g., diameter, length, profile) of the imaged target 4. Telecentric lenses are also most preferred for their low distortion degree (i.e., the deviation between the imaged and real dimensions of the target 4), which further increases the measurement accuracy and image resolution. Reducing the degree of distortion is especially important for proper target classification as many of the defining features of each target 4 are very fine and are typically indistinguishable by existing imaging devices. Furthermore, telecentric lenses are capable of providing measurements on different target planes, accurately defining the profile of the target, providing even image brightness, and bypassing the need to exactly predict the target-to-lens distance (e.g., focal length). Resulting images of the targets utilizing this lens are captured in amazing clarity.

The use of a telecentric lens provides a large depth of field (microns to centimeters) and a long focal length (i.e., the distance from the focal point of the optical system to the lens), facilitating image production with great depths of field relative to particle size. The distal face of the lens 6 (e.g., the end towards the target space 3 through which light enters) is configured in a manner to receive reflected or diffracted light 5 from the particles within the target space 3 (and focal volume).

The housing 12 fits or otherwise securely mounts the optical system 11 within the internal space of the housing 12; the housing 12 is also connected to the primary light source 9 via the connection means 8. The housing 12 is made from any suitable material adapted for an aquatic environment and resistant to degradation from external forces such as water, salt, bio-fouling, dust, and other environmental and circumstantial conditions. The housing 12 is preferably designed to withstand the pressure forces exerted by the surrounding environment which may vary depending upon the depth of desired deployment of the continuous particle imaging device. In some embodiments, the housing 12 is comprised of aluminum or aluminum alloy. In other embodiments, the housing is comprised of steel, stainless steel, steel alloy, or any suitable material adapted for an aquatic environment.

The components of the optical system 11 are generally secured by attachment members such as brackets, rings, supports, screws, nuts, bolts, pins, or the like to securely fasten and prevent undesired movement of the components even in rough environmental conditions or when the particle imaging device is in motion (e.g., towed, when in deployment, in transit). The attachment members may, in some cases, be adjustable to properly position the optical system 11 within the housing 12. In addition, the attachment members may allow for the precise adjustment of the optical components made by means such as fine adjustment screws or similar fasteners. Those skilled in the art will appreciate that many modifications and changes can be made to securely mount each component of the optical system 11 in a functional manner within the housing 12.

Target Imaging Space

The target space 3 is defined by a region in the space disposed between the primary light source 9 and the optical system 11 (e.g., the path length) where the primary light beams 2 may intersect or converge. At the target space 3, a target 4, impinged by the converging primary light beams 2, will reflect, deflect, or refract the light to produce secondary light beams 5 which then impinge the distal face of the lens 6.

In general, the continuous particle imaging device employs an open, free-flow space, referred to as the target space 3, wherein targets present in the surrounding environment typically may move through the free-flow space without deterrence and without force (e.g., pumping). Free-moving organisms may flow into the target imaging space 3, be imaged by the device and associated optical assembly 11, and continue pass through as dictated by the natural flows of the surrounding environment such as the water current or even by the self-propelled movement of the target.

In many embodiments, the targets move through the target space without additional force (i.e., without assistance from the particle imaging device). By allowing the microorganisms to enter the target space without use of a pumping mechanism, a more accurate perspective of the population is obtained. Additionally, forced water movement may damage certain organisms with highly fragile features or disrupt the natural predator-prey interactions. As the inventive device may be utilized in deeper depths, use of a pump would also become problematic; in such case, the free-flow system provides a simple, reliable method of imaging the plankton community.

The focal volume may be modified based on the specific lens and primary lighting source specifications and arrangement. In some embodiments, the target space 3 (e.g., focal volume) is at least or about 1 cm$^3$. In other embodiments, the target space 3 may be larger near 1 m$^3$. In other embodiments, the target space 3 may be between 1 mm$^3$ up to 5 m$^3$ or more.

Data Communication

The particle imaging device often comprises a means to communicate the collected images and data to a local or remote location (e.g., vessel, vehicle, observatory node, buoy, mooring, off-shore platform, land-based facility, server, website, etc.) via an Ethernet interface. The preferred method of data communication is selected to be high-speed Ethernet (e.g., megabit, gigabit) wherein the images and data processed by the image processor (or raw data) is transmitted through a data network connection to one or more local or a remote locations as dictated by the user. The data generated by the continuous particle imaging device may be transformed into any suitable form or size for the transmission of the data to another location or a form or size compatible for a computer system.

In some embodiments, the capacity of the Ethernet connection is at least 1-megabit per second, up to 1-gigabit per second, 2-gigabits per second to 10-gigabits per second, 10-gigabits per second to 25-gigabits per second, or greater. Although an Ethernet connection is preferred, any suitable data connection capable of transmitting the digital images and data from the particle imaging device to another location may be employed with the present invention. In one embodiment, the digital images and data collected by the continuous particle imaging device are relayed to another location in real time via a data connection (e.g., Ethernet connection). In further embodiments, the images and data are transferred continuously. In other embodiments, transmission of the collected images/data is programmed to transmit periodically as defined by the user.

Image Processing and Classification

Imaging data (e.g., the digital image and data) is transmitted to the host computer (e.g., the particle imaging device's computer) and either stored directly onto a storage device or directed to a processing pipeline to conduct Bayer color decoding, color correction, light field normalization, extraction of the "Region of Interest" ("ROI") surrounding in-focus targets, and/or other requirement image processing procedures. In one embodiment, software running on the host computer will check each image to see if there are targets in the image which satisfy a series of criteria, including but not limited to, the number of contiguous pixels that are greater than a specified value using a defined blob detection routine, brightness threshold, and in-focus threshold. If any imaged target meets the threshold criterion, the code places a bounding box around the blob (i.e., the imaged target) with an expansion factor of a user-controlled value in the configuration file. It will then write pixels of the ROI to a specified location on a local or remote storage device (e.g., hard drive). All of the pixels constituting each ROI are saved, thereby producing a full resolution of the image and eliminating the need to compress information.

The image processing procedure can also have several configurations. Optional configurations include, by way of example, ROI extraction and target classifications. Internal ROI extraction greatly reduces the bandwidth of information transmitted by the instrument to a remote or local storage location. In one embodiment, a custom Field Programmable Gate Array ("FPGA") coupled with a Graphical Processing Unit (GPU) and RISC-based ARM processor conducts all of the steps described above for on-instrument ROI extraction and target classification reducing the information stored by a factor of 10,000 or more.

Target classification has long been a challenge in the field as species recognition is often complicated by the variation within a species, and a good classifier must have enough flexibility to accommodate this intra-species variation while still able to distinguish between species. As it is far too time-consuming (and often inaccurate) to identify each image manually (e.g., by eye), an automated classification system is absolutely essential. In many cases, the accuracy of species identification depends on the quality of the training sets of identified and classified species used for comparison with the imaged targets, including species-related features, size, profile, orientation, color, color distribution, and such.

Classification may also be performed on a remote computer, operating on ROIs that have been transmitted through an Ethernet connection. Primarily, ROI extractions are performed on-board. Classifications and subsets of images can be transmitted across low bandwidth ports, and the open board classifier and configuration files may also be updated across this link.

Figure 5:
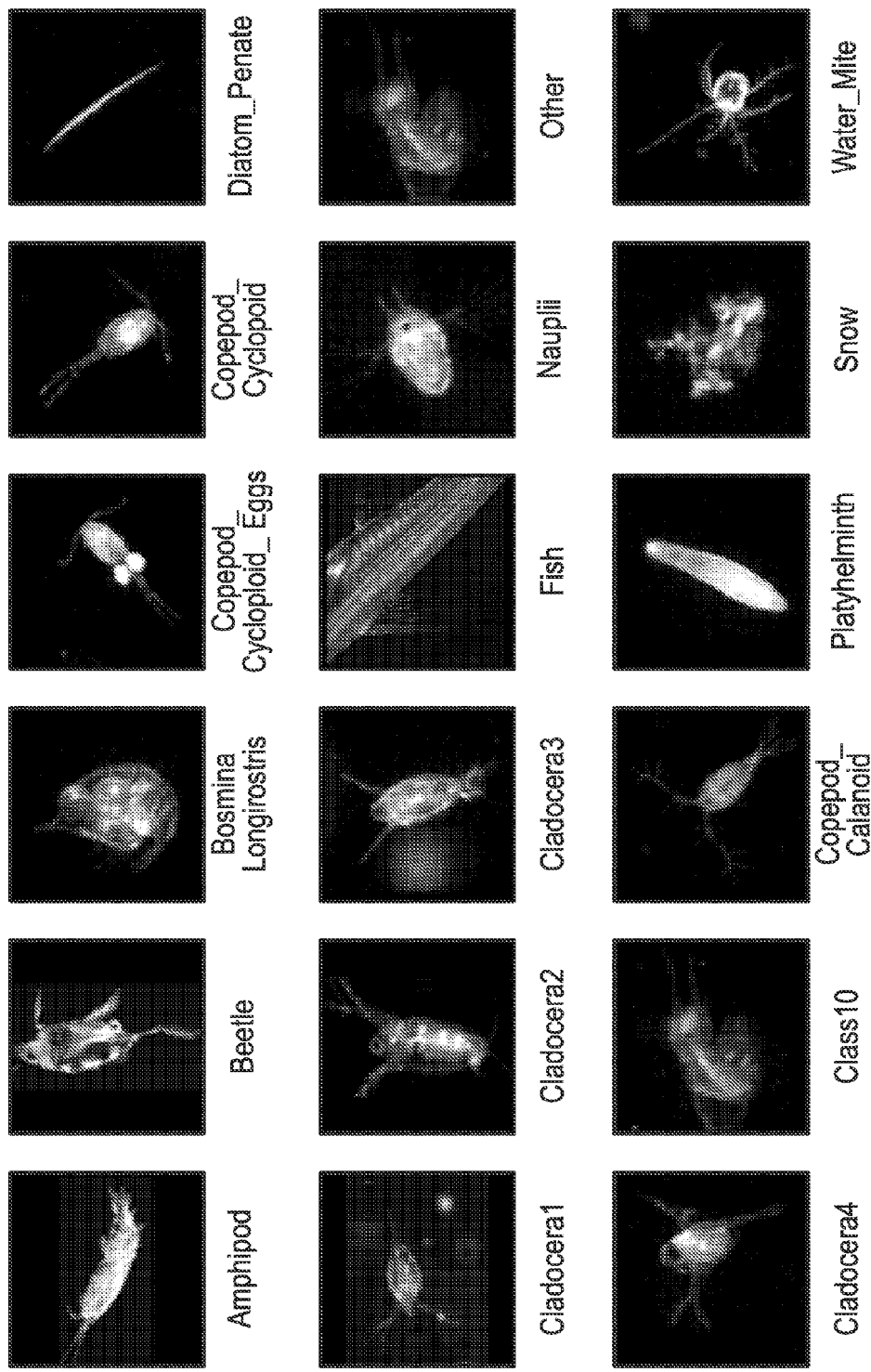
FIG. 5 depicts a subset of regions of interest (ROIs) which are sorted into training sets to feed into the automated classification of a dataset collected by the continuous particle imaging device, according to one embodiment.

Target classification is often divided into categories which may vary depending up the plankton communities present in the sampling environment. These categories may be based on any specific characteristics of the plankton and may include classification on the domain, kingdom, phylum, class, order, family, genus, or species level. FIG. 5 illustrates a subset of a target classification set of ROIs for one embodiment which are sorted and provided to the computer to perform automated classification. In another embodiment, target classification is divided into 11 primary categories representing the main plankton taxonomic groups present in the sampling area: filamentous cyanobacteria (*Trichodesmium* spp.), diatoms, radiolarians (primarily acantharians), foraminiferans, copepods, isopods, cnidarians, other zooplankton (e.g., appendicularians, ostracods, and larval molluscs), mysids, and fish; and a marine snow "particle" category regrouping all non-living particles. The size range of this particular set of particles is approximately 100 µm to 10 mm in length. Any specific training set of plankton ROIs may be delivered to the continuous particle imaging device, allowing the device to be highly adaptable and provide accurate classification of desired plankton and particles. Each training set may be focused on a specific size scale, a select level in the taxonomic hierarchy (e.g., species, genus, family, order, etc.), a select distinguishing feature (e.g., profile, color, transparency, etc.), or any suitable criteria desired by the user to facilitate classification of the imaged targets. Additionally, each training comprises at least one category of at least one microorganism or particle up to 5, 10, 20, 30, 50, 100, or even up to 1,000 unique microorganism identifications (IDs) and/or categories or more.

Figure 6:
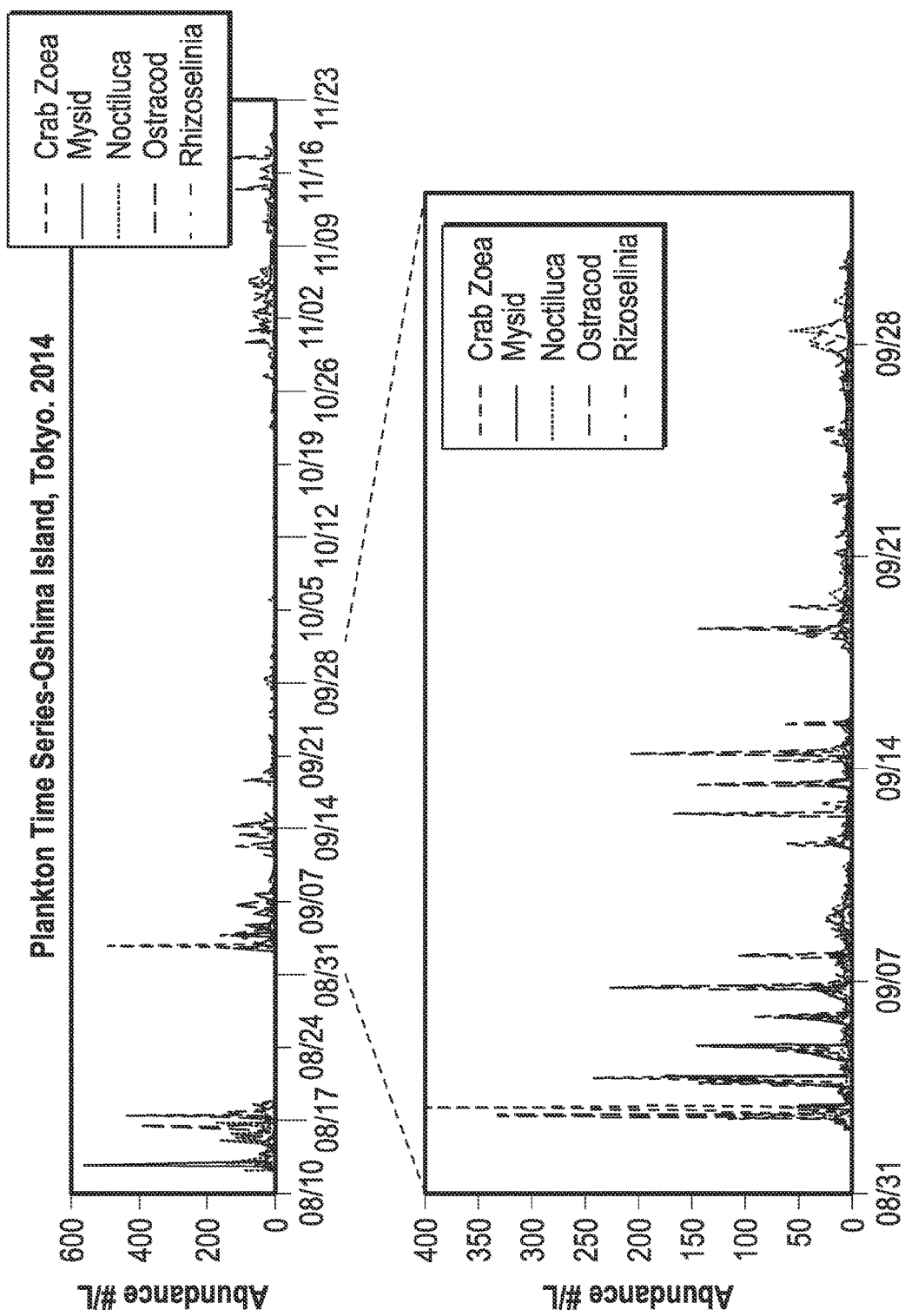
FIG. 6 displays data obtained during one deployment of the present invention as a time series of the abundance of select microorganisms present in aquatic environment.
Figure 7:
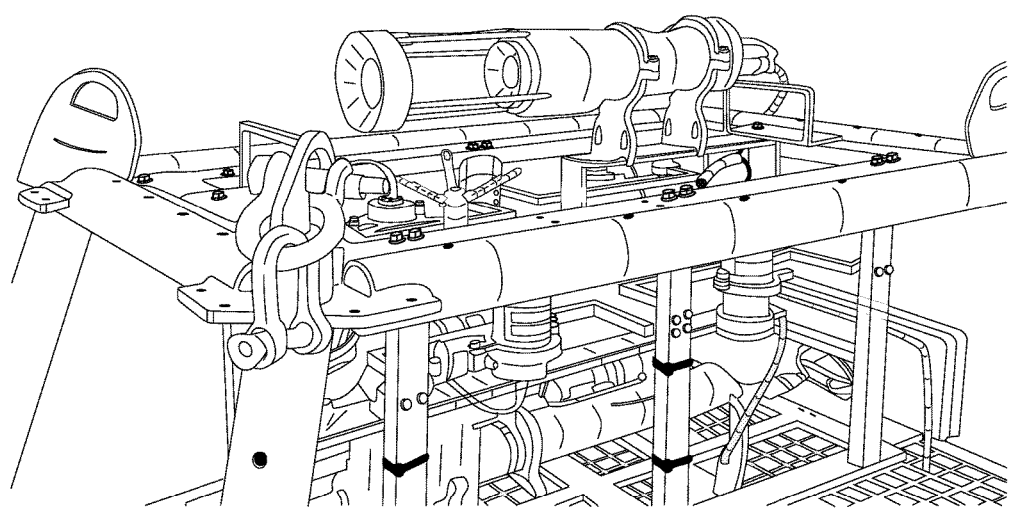
FIG. 7 shows an illustrated embodiment of the continuous particle imaging device disposed on an underwater observatory.
Figure 8:
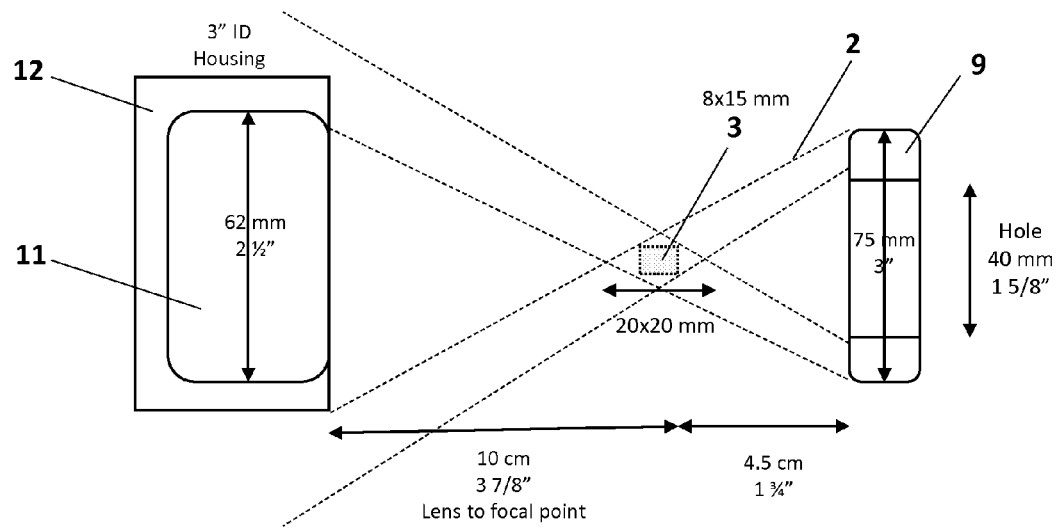
FIG. 8 depicts one particular embodiment of the continuous particle imaging device.

As shown in FIG. 6, the classified data obtained during the deployment of the present invention is depicted in a time series and provides quantification of the abundance of select microorganisms present in aquatic environment, according to one embodiment. In some embodiments, quantification (e.g., counts, population) and/or size measurements are determined automatically by the present invention. In another embodiment, information collected on the imaged targets is presented as a time series of target data (as in FIG. 6) and is either transmitted to another platform or location (e.g., automatically, in real-time) or stored on the storage device for later retrieval.

The accuracy of the classification can be adjusted by focusing on certain critical points. First, accuracy can be adjusted by the number of high quality training sets. As more extensive training sets are produced, the classifier may be run over all of the ROIs that have been collected for a particular time period. Second, by combining certain feature extraction techniques, the accuracy can be increased exponentially. In the preferred embodiment, Gabor wavelets are used to extract information on the texture, morphology, and orientation of the target. Then, the color angles are used to get information on the color intensity in hue space and color distribution throughout a target. The combination of these two feature sets in the preferred embodiment is extremely powerful. Third, the classifier device itself can be calibrated. The use of a Support Vector Machine is disclosed, but the Random Forests classification method in parallel are also implemented. The output from the Gabor filters and color angles results more than 1000 features. The dimensionality of this set can be reduced by principle component analysis before training and classification.

The "focus" parameter operates by subtracting a decimated and smoothed, or blurred, image from the original image. The closer the resultant image is to the original, the less in-focus the original. The focus threshold also partially defines the image volume and is critical to the calibration of the instrument.

In its most basic form, as the ROIs come in from the camera via the camera and telecentric lens module, an algorithm is used to compute a series of feature extractions with the image processor and a statistical machine vision classifier (e.g., Support Vector Machine, Random Forests, Boosted Regression Trees), is run to classify the ROI into one of many categories that have been manually set up and trained on by the user to produce a data output (FIG. 2).

In addition to the imaging processing components described above, the system often includes a digital data storage device for storing the collected images and/or data. Such device is capable of reliable image collection and/or data transfer without degradation to performance or data quality even when the particle imaging system is disposed in an aquatic environment with rough environmental conditions. The electronics and software are generally disposed in the housing 12. The storage device may be configured for flexibility of use in terms of data storage capacity and data transfer capabilities depending on the specific use of the particle imaging system. In some embodiments, the storage device collects the images and data obtained by the optical assembly and archives them for later retrieval in either a raw or processed format. In other embodiments, the storage device is capable of storing the images and data and relaying the collected information (automatically or on command) to a selected location such as the attached mooring, a vessel, a land-based facility, or other desired platform. The storage device may include one or more hard drives as necessary for the length of the deployment of the system. In further embodiments, the storage device transfers the collected data in real time (e.g., immediately, after imaging, after image processing, continuously). In other embodiments, the storage device periodically sends the collected images and data as dictated by the user's settings. In some embodiments, the storage device is configured for high-speed recording/processing (e.g., data reading, writing, retrieving, caching) of data including rates of at least 10 megabits/s, at least 100 megabits/s, at least 200 megabits/s, at least 400 megabits/s, at least 500 megabits/s, up to 1 gigabits/s, up to 2 gigabits/s, up to 5 gigabit/s, or greater.

Should it be desired to have the collected images and data relayed immediately to a selected platform, the storage device may comprise an established communication connection with the Ethernet interface. In some embodiments, the storage device is coupled to an Ethernet connection via a copper cable or a fiber optic cable such as a CAT5, a CAT5e, a CAT6 cable, or other suitable connection means of data communication. Certainly, other alternative methods of relaying the collected images and data may be equally employed with the present invention.

As a cabled instrument in its most basic configuration, the power supply (e.g., batteries or the like) and Ethernet are supplied from an external source including, but not limited to, a towed vehicle, CTD rosette, or cabled observatory or mooring. The system can be controlled from ship or shore through custom software and a configuration file that contains the operating information. In the preferred embodiment, the image data is transmitted as raw 12 bit Bayer encoded 6 megapixel images to the host computer.

Additionally information on image processing and target classification which may be utilized with the present methods may be provided in U.S. Pat. No. 7,415,136 incorporated by reference in entirety.

Mode of Operation

The continuous particle imaging device is capable of multiple configurations and magnifications. The specific configuration or magnification will depend upon the imaging task at hand, with the invention providing solutions for a wide array of applications including being towed or moored. The system will also provide for vehicle operations that will image marine snow, zooplankton, phytoplankton, and a variety of microplankton. The particle imaging system may be affixed, attached, mounted, positioned, or otherwise secured to a vehicle or platform. In some embodiments, the particle imaging system is attached to a vehicle such as an autonomous underwater vehicle (AUV), a remotely operated vehicle (ROV), a glider (e.g., Jet Yak), an autonomous profiling mooring (e.g., profiler), a submarine, a mini submarine, a human operated vehicle (HOV), a towed body, or any vehicle deemed suitable for underwater operations. In other embodiments, the particle imaging system is attached to a platform, moored, or otherwise affixed to remain stationary such as a mooring, a buoy, a float, an off-shore station, a profiler which remains stationary for a period of time at selected depths, or the like.

The imaging system may be towed behind a marine boat or watercraft wherein the particle imaging device is tethered or suitably connected to the watercraft by any means known in the art.

The described features, advantages, and characteristics may be combined in any suitable manner in one or more embodiments. One skilled in the relevant art will recognize that the circuit may be practiced without one or more of the specific features or advantages of a particular embodiment.

In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

Example 1

This example depicts one embodiment of assembly scheme of the continuous particle imaging device.

A Continuous Plankton Imaging and Classification Sensor (CPICS, Woods Hole Oceanographic Institution, USA) was installed on the main underwater node, about 1.60 m above the seafloor, equipped with a Prosilica GT 1380 camera (Allied Vision) and a synchronized strobe light in waterproof housings, imaging an 8.00×7.50×0.55 mm volume of water 4 times per second (0.48 L/h). Images (1380×1024 pixels) were processed in real-time on shore to bound all objects exceeding 645 µm² (100 adjacent pixels) as "Regions of Interest" (ROI), using graphic processing hardware and customized software. The software is capable of recording up to 999 ROI per full image to hard disk, a limit that was never reached during the present study.

Example 2

This example pertains to the on embodiment of calibration of the continuous particle imaging device (CPICS) to obtain a region of maximum focus volume.

Calibration of the CPICS involves measuring the field of view (FOV) and the depth of field (DOF). The FOV is simply measured using a micronometer scale getting image width×image height while in seawater. The DOF is measured two ways: The first way uses a micronometer scale is set at an angle of 30 degrees in the field of view while the CPICS is immersed in seawater. The number of micron scale bars that are in-focus and can be read is the DOF. However, the settings on the CPICS graphical user interface (GUI) for Focus Threshold (FT) are what actually allow the software to capture the regions of interest (e.g., ROIs, targets) so the DOF has to be set in relation to FT. The default FT in the configuration file is 0.40 but can vary between 0.20 (capturing more out of focus ROIs) to 0.50 (capturing fewer ROIs in tighter focus). A table of values for FT and the number of in-focus scale bars being captured by the software is what actually provides the DOF. At FT=0.40, DOF=2.4 mm.

The second way to calibrate, which may be a bit more accurate, is to set up a plankton target (such as copepods embedded in clear epoxy in a dish) that is translated across the DOF robotically using a linear translator (e.g., robotic drive system). As the target moves into focus at a particular FT setting, ROIs will be captured as the target comes into focus and then as it goes out of focus fewer and fewer ROIs are captured. If the total number of copepods captured (ROI) is 100, then the edges of the DOF are set to ½ of 100=50 ROIs. So the near side of the DOF is when 50 ROIs are captured and the far side is again when 50 ROIs are captured. Again, this process is repeated at varying FT settings to provide a table of DOF values as a function of FT in the GUI. Then, the operator has a true calibration at whatever GUI FT setting was used during ROI extraction.

The FOV×DOF=Image Volume (IV) (e.g., focal volume) so for the current CPICS with 0.9× lens and a GUI FT setting of 0.40 the IV is: 12×10×2.6 mm=312 mm³ or 0.312 mL.

In turn, the Sample Volume (SV) is calculated as SV=IV× Frame Rate (FR). So at a FR of 6 Hz the SV would be 0.312×6=1.87 mL/s or 6.7 L/h.

Example 3

This example illustrates one embodiment of the ROI detection algorithm.

The ROI detection algorithm starts with an in-focus detection process followed by setting a bounding box and extraction of pixels in the bounding box. First, the green channel of the raw deBayered image (RGB) is subjected to a Canny edge detector followed by a binarization of the image with threshold set dynamically. The binary image is subjected to an erosion and dilation process followed by two additional dilations to fill in gaps. The binary image is then labelled with blob centroids and bounding boxes with perimeters set by the Expansion value in the GUI, typically set to 200%. This draws a bounding box around each blob and expands it by 200% beyond its maximum axial dimensions. The pixels in the bounding box now represents an image subset of the original. The next step is to decide if the information in the ROI is in-focus. To accomplish this, the ROI is first filtered by a Gaussian blurring algorithm. The result (e.g., the smoothed image) is then subtracted from the original ROI. The intensity map of the difference between the blurred and original ROI is binned in a frequency histogram. If there are a specific number of pixels brighter than a given threshold (the Intensity Threshold, IT) set in the GUI then the ROI is considered in-focus and is saved to disk. If the difference is small it means that the original ROI is out of focus just as the blurred ROI is so the ROI is discarded. This focus detection process is unique and has not been implemented in previous image processing routines.

Example 4

This example describes one embodiment based on the evaluation of error associated with both the volume sampled and spatial measurements in 2D.

The errors associated with the calibration of DOF, FOV, and IV are known and quantified during the calibration process. Since the user calibrates the CPICS by building a table of values for IV versus FT, not only the mean IV but the variance is quantified. This provides the unique ability for the end user of CPICS to provide a target density +/−, the variance of the calibration, which is usually not known for an imaging system.

What is claimed:

1. An imaging device capable of capturing high-resolution images in an aquatic environment, comprising:
    a high-resolution optical system, disposed in a housing;
    a lens with an image face and a defined focal length;
    a primary light source, disposed distal and opposite to the image face capable of producing two or more primary light beams wherein said primary beams do not intersect with the image face;
    a connection means, connecting said primary light source to the housing of the optical system at a distance away from said optical system;
    a target space, located in a region between the primary light source and the lens, defined by the intersection of the primary light beams and the lens focal length and capable of accommodating a target to be imaged; and a power source, operably connected to said optical system and said primary light source;

wherein said primary light beams interact with a target in the target space to produce a secondary light beam which impinges on the image face of the lens.

2. The device of claim 1, wherein the lens is a telecentric lens.

3. The device of claim 1, wherein the target space comprises an open free-flow space to allow targets to flow through said target space and be imaged in their natural orientation and without collection.

4. The device of claim 1, wherein the primary light source comprises one or more light-emitting sources capable of emanating primary light beams onto a target.

5. The device of claim 4, wherein each light-emitting source emanates light selected from the group comprising monochromatic light, polychromatic light, white light, red light, ultraviolet light, and a combination thereof.

6. The device of claim 1, wherein the primary light source is capable of intermittent illumination, and the intermittent illumination occurs at a specified rate relative to the camera's exposure duration.

7. The device of claim 1, wherein the primary light source is located from the optical system at a distance selected from a group comprising less than 1 cm, 1 cm, 2 cm, 3 cm, 4 cm, 5 cm, or 6 cm.

8. The device of claim 1, wherein the device is capable of submergence in an aquatic environment and may be adapted to image targets at a depths selected from a group comprising less than 0.5 m, 0.5 m, 1 m, 5 m, 10 m, 20 m, 30 m, 50 m, 100 m, 250 m, 500 m, 1,000 m, 2,000 m, or 6,000 m.

9. The device of claim 1 further comprising an anti-fouling system selected from a primary light source comprising one or more ultraviolet light-emitting sources, a lens with anti-fouling properties adapted to pass undistorted image information through said lens, a mechanical defouling device, and a combination thereof.

10. The device of claim 9, wherein the primary light source comprising one or more ultraviolet light-emitting sources provides an anti-fouling capacity selected from emitting ultraviolet light intermittently offset in time from the illumination for capturing images, emitting an ultraviolet light dose for a pre-determined length of time, and a combination thereof.

11. The device of claim 9, wherein the anti-fouling system comprises a lens with anti-fouling properties such as a coating of colloidal titanium dioxide nanoparticles.

12. The device of claim 1, wherein when the primary light beams do not impinge a target, said beams are directed toward infinity.

13. The device of claim 1, wherein the device is disposed in an aquatic environment and secured to a platform selected from an autonomous underwater vehicle (AUV), a remotely operated vehicle (ROV), a glider, a profiler, a submarine, a mini submarine, a human operated vehicle (HOV), a mooring, a buoy, a float, an off-shore station, and a watercraft for towing said device.

14. The device of claim 1, wherein the primary light source comprises at least one light-emitting source capable of emanating beams produced by said primary light source at an angle less than 50 degrees from a central imaging axis.

* * * * *